2,800,559

ELECTRICAL SEMI-CONDUCTORS COMPRISING ORGANO METALLIC COMPOUNDS AND PROCESS OF PRODUCING SAME

Alfred Rene John Paul Ubbelohde, Belfast, Northern Ireland, assignor to National Research Development Corporation No Drawing. Application July 23, 1953,
Serial No. 369,954

11 Claims. (Cl. 201—63)

This invention relates to new electrical semi-conductors.

It has long been known that alkali metals form addition compounds with hydrocarbons of aromatic or unsaturated character and with analogous compounds in which nitrogen or another atom, e. g. sulphur or oxygen takes the place of carbon e. g. such compounds as contain the unsaturated groupings —N=C= or —N=N— and such compounds have been prepared by warming the hydrocarbon or analogous compound and the alkali metal in the presence of a solvent. The formation of the alkali metal addition compound has been observed in some instances and inferred in others, but the compounds have not hitherto been isolated in a form which is free or substantially free from solvent and from unchanged alkali metal.

The invention is based on researches into methods of isolating reaction products of this general character and investigations into the properties of the isolated reaction products, some of which have hitherto been prepared but not isolated, and some of which, I believe, have not hitherto been prepared.

In accordance with the invention semi-conductive compounds are produced by treating in the absence of oxygen an element having an ionisation energy not greater than that of calcium (that is, greater than 6.1 volts for the removal of the first electron in the neutral atom in the gaseous state) with an organic compound having one or more labile electrons and a sufficiently high affinity for electrons to form addition compounds with the element without however completely immobilising any transferred electrons, and isolating the reaction product, also in the absence of oxygen.

Elements having suitable ionisation energies for treatment in accordance with the invention are exemplified in the following list:

| Element | Ionisation energy in electron-volts |
| --- | --- |
| Lithium | 5.4 |
| Sodium | 5.1 |
| Potassium | 4.3 |
| Rubidium | 4.2 |
| Caesium | 3.9 |
| Calcium | 6.1 |
| Strontium | 5.7 |
| Barium | 5.2 |
| Lanthanum | 5.5 |
| Indium | 5.8 |
| Praseodymium | 5.7 |

To form the desired addition compounds it is necessary that the organic compound should have a high affinity for electrons, so that the required addition compound will be formed without, however, completely immobilising any transferred electrons. The desired property is possessed by a number of hydrocarbons and analogous compounds in which nitrogen or another atom replaces one or more of the carbon atoms in a carbon-carbon chain. Thus, aromatic compounds with three or more condensed rings may be employed.

Long chain aliphatic hydrocarbons having conjugated double-bond systems may also be employed, particularly those in which there are one or more rings as substituents. Cycloaliphatic hydrocarbons having a ring of 8 or more carbon atoms and a system of conjugated double-bonds may be also used as starting material. Finally, there may be used compounds analogous to the compound hydrocarbons in which one or more carbon atoms are replaced by nitrogen. Some examples of such compounds are the following: tetraphenylethylene, 1:1 bis-diphenylylethylene, p-terphenyl diphenylfulvene, bis-diphenylene ethylene, anthracene, 1,1,3 triphenyl indene, 2,6-dimethyl-4-methylene-hepta-2,5-diene, 1-diphenylene-4-phenyl-beta 1,3-diene, tetra (p-dimethylaminophenyl) ethylene, 1-cyano-1,2,2-triphenyl-ethylene, 1,3,5-triphenyl-2,4-diazapenta-1,4-diene, 5-phenyl acridine, 2,4,5-triphenyldihydroglyoxaline, di-benzopyrazine, and dixanthylene.

The reaction between the element and the hydrocarbon or like compound may conveniently be effected in the presence of an inert solvent in an oxygen free atmosphere. Excess hydrocarbon or the like and the solvent may be removed by elutriation and filtration, preferably followed by evaporation, and any unreacted metallic element may be removed mechanically. The addition compound may then be compressed and transferred whilst still protected from oxygen, to a glass envelope fitted with electrodes or be brought into contact with suitable electrodes and varnished.

In the process as described above the effect of the solvent is to bring into liquid phase those hydrocarbons or like compounds which are solids. A solvent may slow down or accelerate the reaction and may be included in the reaction mixture for this purpose even when the hydrocarbons or like compounds are liquids.

An alternative method of carrying the invention into effect is to bring about the reaction between the element and the hydrocarbon or the like by bringing together the reactants by direct impingement in high vacuo of the metal vapour on the organic compound.

The process of the invention is illustrated by the following examples:

EXAMPLE 1

*Preparation of solid solvent-free potassium anthracene*

After removal of all air and moisture from the reaction vessel, anthracene is allowed to react with potassium carefully freed from its oxide in an atmosphere of nitrogen. Dioxan is used as solvent and the system is preferably heated to above the melting point of the metal.

On completion of the reaction the hot dark green solution is filtered off from unreacted residue, in complete absence of air and moisture, using a sintered glass filter. The crystals which deposit on cooling the filtrate are washed free from dioxan by successive decantations with diethyl ether, and any solvent incorporated in the solid is finally removed by warming in high vacuum. This leaves a grey solid. A typical analytical composition is metal:anthracene, 1.18:1. The proportion of metal to hydrocarbon in this solid may be increased in one of two ways.

(i) The solid is washed in complete absence of air with benzene or diethyl ether or other solvents on a glass filter, till no more preferential removal of hydrocarbon takes place. Any solvent adhering to the solid is then removed by exposure to high vacuum. This leaves a solid whose composition may attain metal:anthracene, 2:1.

(ii) The solid as prepared in (i) is heated in high vacuum at about 100–150° C. This gradually removes more of the anthracene leaving a solid darker in colour and richer in alkali metal.

EXAMPLE 2

*Preparation of solvent-free lithium anthracene*

Anthracene is allowed to react in an atmosphere of nitrogen with metallic lithium freed from all impurities, using diethyl ether as solvent and excluding all air or moisture and stirring the system. When reaction is complete the ether layer is siphoned off from the purple addition compound produced. This solid is washed several times with pure ether by decantation, and all the ether is then removed using a stream of nitrogen and application of vacuum. Any unreacted bright pieces of lithium metal can be picked out from the yellow powder produced. A typical composition is metal:anthracene, 1.16:1. The anthracene content can be varied as in the potassium compound.

EXAMPLE 3

*Preparation of solvent-free sodium anthracene*

A layer of anthracene is caused to form a coating on a metal or glass surface inside a closed vessel, and the surface is maintained a few degrees below the melting point of the hydrocarbon. The closed vessel also includes means of generating sodium atoms, by heating a metal vessel containing the sodium, after the apparatus has been evacuated. The compound is formed by allowing the sodium atoms to impinge on the warm layer of hydrocarbon. After removal the anthracene content in the powdered product can be varied as above.

EXAMPLE 4

*Preparation of solvent-free dilithium cyclo-octatetraene*

Pure lithium is allowed to react in the absence of air as in Example 2, with redistilled cyclo-octatetraene. Excess hydrocarbon is removed by decantation with pure ether, and the solid is isolated in a solvent-free condition as above.

The electrical properties of these solids are profoundly modified by the alkali metal organic molecule ratio. The temperature co-efficient of electrical conductance C is positive, as for typical semi-conductors which can approximately be represented by the equation $$\log C = \log C_0 + E/RT$$

where R is a constant and E is the ionisation energy in electron volts E/R giving the temperature co-efficient.

Electrical characteristics depend on the ratio metal organic molecule, as illustrated in the following table for the sodium-anthracene compounds.

| Atoms Sodium: Molecules Anthracene | Conductivity in mols per centimetre cube at 20° C | E electron volts |
|---|---|---|
| 1.08:1 | $4.9 \times 10^{-11}$ | 1.20 |
| 1.42:1 | $3.4 \times 10^{-10}$ | 1.16 |
| 1.70:1 | $7.1 \times 10^{-10}$ | 0.88 |
| 2.02:1 | $1.9 \times 10^{-10}$ | 0.76 |

These measurements are for powders compressed under a pressure of 20 kg. per sq. cm., and represent conductivities measured in a forward direction. With higher compression pressures the absolute conductivities are higher but the temperature co-efficient and forward to backward conductivity ratios do not vary materially.

Because of the modifications of the mobile electrons in the organic molecules, resulting from addition of the alkali metals, magnetic properties of the solids also depend on the ratio metal:organic molecule. Thus all the sodium compounds quoted are paramagnetic, and the specific susceptibility at ordinary temperature of the powders range from 0.18 to 3.25 c. g. s. units.

The electrical properties depend on the nature of the metallic element as well as the composition, and the organic molecule used. It seems likely that the ionisation potential of the alkali-metal is involved. Thus temperature coefficients (forward measurements) of resistance for other compositions correspond with the following ionisation energies, as illustrated in the following table:

E in electron volts
Li$_{1.17}$ anthracene _____ 1.34
Na$_{1.17}$ anthracene _____ 1.20
K$_{1.17}$ anthracene _____ 1.10

These measurements were also made for powders compressed at 20 kg. per sq. cm.

Amongst the compounds prepared for investigation were sodium cyclo-octatetraene and potassium anthracene which we believe have not hitherto been prepared.

The new products may be used as transistor materials, rectifiers and materials whose conductivity is sensitive to irradiation in the visible or invisible rays of frequencies.

I claim:

1. A semi-conductive substance in the solvent-free solid state being an organo-metallic addition compound having as its essential constituents at least one metallic element having an ionization energy not greater than that of calcium and at least one organic compound composed wholly of non-metallic elements and having a conjugated system of double bonds and a sufficiently high affinity for electrons to form addition compounds with said metallic element without however immobilizing any transferred electrons with formation of an ion.

2. A semi-conductive substance as claimed in claim 1 in which the metallic element is selected from the group consisting of lithium, sodium, potassium, rubidium, caesium, calcium, strontium, barium, lanthanum, indium and praseodymium.

3. A semi-conductive substance in the solvent-free solid state being an organo-metallic addition compound having as its essential constituents at least one metallic element having an ionization energy not greater than that of calcium and at least one organic compound composed wholly of non-metallic elements selected from the group consisting of tetraphenylethylene, 1:1 bis-diphenylylethylene, p-terphenyl, diphenylfulvene, bis-diphenylene ethylene, anthracene, 1,1,3 triphenyl indene, 2,6-dimethyl-4-methylene-hepta-2,5-diene, 1 - diphenylene-4-phenyl-beta 1,3-diene, tetra (p-dimethylaminophenyl) ethylene, 1-cyano-1,2,2-triphenyl-ethylene, 1,3,5-triphenyl-2,4-diazapenta-1,4-diene, 5-phenyl acridine, 2,4,5-triphenyldihydroglyoxaline, dibenzopyrazine, and dixanthylene.

4. A semi-conductive substance in the solvent-free solid state being an organo-metallic addition compound having as its essential constituents at least one metallic element selected from the group consisting of lithium, sodium, potassium, rubidium, caesium, calcium, strontium, barium, lanthanum, indium, praseodymium, and at least one organic compound selected from the group consisting of tetraphenylethylene, 1:1 bis-diphenylylethylene, p-terphenyl, diphenylfulvene, bis-diphenylene ethylene, anthracene, 1,1,3 triphenyl indene, 2,6-dimethyl-4-methylene-hepta - 2,5 - diene, 1 - diphenylene-4-phenyl-beta 1,3 diene, tetra (p-dimethylaminophenyl) ethylene, 1-cyano-1,2-triphenyl-ethylene, 1,3,5-triphenyl-2,4-diazapenta-1,4-diene, 5-phenyl acridine, 2,4,5-triphenyldihydroglyoxaline, dibenzopyrazine, and dixanthylene.

5. A semi-conductive element comprising a compressed mass of a solid, solvent-free organo-metallic addition compound as defined in claim 1 sealed in an envelope provided with electrodes in contact with such compressed addition compound.

6. A process of preparing a semi-conductive substance as claimed in claim 1 which comprises bringing together the reactants by direct impingement in high vacuo of the metallic element vapour on the organic compound.

7. A process of preparing a semi-conductive substance in the solid state being an addition compound having as its essential constituents at least one metallic element having an ionization energy not greater than that of calcium and at least one organic compound composed wholly of non-metallic elements and having a conjugated system of double bonds and a sufficiently high affinity for electrons to form addition compounds with said metallic element without, however, immobilising any transferred electrons with formation of an ion which includes effecting the reaction between the metallic element and the organic compound in the presence of an inert solvent in an oxygen free atmosphere, filtering in complete absence of air and moisture, washing the compound which deposits on cooling the filtrate with a liquid in which it is insoluble, to free it from solvent, and removing such liquid from the compound.

8. A semi-conductive substance in the solvent-free solid state being an organo-metallic addition compound of sodium and cyclo-octatetraene.

9. A semi-conductive substance in the solvent-free solid state being an organo-metallic addition compound of potassium and anthracene.

10. A semi-conductor consisting of a compressed mass of a solid, solvent-free organo-metallic addition compound having as its components at least one metallic element having an ionization energy not greater than that of calcium and at least one organic compound composed wholly of non-metallic elements and having a conjugated system of double bonds and a sufficiently high affinity for electrons to form addition compounds with said metallic element without however immobilizing any transferred electrons with formation of an ion.

11. A process of preparing a semi-conductive substance in the solid state being an addition compound having as its essential constituents at least one metallic element having an ionization energy not greater than that of calcium and at least one organic compound composed wholly of non-metallic elements and having a conjugated system of double bonds and a sufficiently high affinity for electrons to form addition compounds with said metallic element without however immobilizing any transferred electrons with formation of an ion which includes effecting the reaction between the metallic element and the organic compound in the presence of an inert solvent in an oxygen free atmosphere filtering in complete absence of air and moisture, washing the compound which deposits on cooling the filtrate with a liquid in which it is insoluble, to free it from solvent, removing such liquid from the compound and varying the proportion of added element and organic compound in the addition compound by elutriation with a solvent and filtration followed by removal of the solvent in vacuo.

References Cited in the file of this patent
UNITED STATES PATENTS

| | | |
|---|---|---|
| 2,027,000 | Scott | Jan. 7, 1936 |
| 2,108,277 | Walker | Feb. 15, 1938 |
| 2,164,595 | Siebertz | July 4, 1939 |
| 2,239,642 | Burkhardt et al. | Apr. 22, 1941 |
| 2,451,739 | Isler | Oct. 19, 1948 |
| 2,454,082 | Morton | Nov. 16, 1948 |

OTHER REFERENCES

Gilman et al.: Jour. Am. Chem. Soc., vol. 65, pages 267–70 (part 2, 1943).

Krause and Von Grosse: "Die Chemie der metall-organischen Verbindungen," pages 79–84 (1943), published by Edwards Bros. Inc., Ann Arbor, Michigan.

Pauling: The Nature of the Chemical Bond, pages 401–405 (1948), pub. by Cornell Univ. Press, Ithaca, New York.